Oct. 9, 1973  J. M. DAWSON  3,764,466
PRODUCTION OF PLASMAS BY LONG WAVELENGTH LASERS
Filed April 1, 1971  3 Sheets-Sheet 1

INVENTOR.
John M. Dawson

United States Patent Office
3,764,466
Patented Oct. 9, 1973

3,764,466
PRODUCTION OF PLASMAS BY LONG-WAVELENGTH LASERS
John M. Dawson, Princeton, N.J., assignor to the United States of America as represented by the United States Atomic Energy Commission
Continuation-in-part of application Ser. No. 12,518, Jan. 20, 1970. This application Apr. 1, 1971, Ser. No. 130,368
Int. Cl. G21l 1/00
U.S. Cl. 176—1         2 Claims

ABSTRACT OF THE DISCLOSURE

Long-wavelength laser system for heating low-density plasma to high temperatures. In one embodiment, means are provided for repeatedly receiving and transmitting long-wavelength laser light in successive stages to form a laser-light beam path that repeatedly intersects with the equilibrium axis of a magnetically confined toroidal plasma column for interacting the laser light with the plasma for providing controlled thermonuclear fusion. Embodiments for heating specific linear plasmas are also provided.

BACKGROUND OF THE INVENTION

This invention was made in the course of, or under contract AT(30–1)1238 with the United States Atomic Energy Commission. As will be understood from the following and from co-pending application Ser. No. 12,518, filed Jan. 20, 1970, by the inventor of this application, this application is a continuation-in-part of the above-mentioned co-pending application, which is assigned to the assignee of this application under the above-mentioned contract AT(30–1)1238.

In the field of physics, a need exists for laser produced plasmas. One system for producing a plasma is disclosed in U.S. Pat. 3,378,446 by J. R. B. Whittlesey. Another laser system for producing a plasma is disclosed and shown in U.S. Pat. 3,489,645 by J. W. Daiber et al. Both these systems require short-wavelength (about 1 $\mu$m.) ruby or glass lasers for producing the plasma. Moreover, these systems have been difficult and expensive to operate, and they have been otherwise limited by practical or other considerations. For example, relatively high initial and final plasma densities have been required.

SUMMARY OF THE INVENTION

It has been discovered in accordance with this invention that long-wavelength lasers are advantageously employed for producing and/or heating plasmas of relatively low density. In this regard long-wavelength lasers having wavelengths of 10$\mu$m. or more have the distinct advantage over the roughly 1 $\mu$m. wavelength ruby and/or neodymium glass lasers known heretofore of heating plasmas of densities at or below about $10^{19}$ particles/cm.$^3$. For example, ten micron radiation effectively heats plasma in accordance with this invention at densities at or below $10^{19}$ electrons/cm.$^3$, whereas the 1-micron radiation known heretofore becomes substantially ineffective for heating plasmas at densities at or below about $10^{19}$ particles/cm.$^3$. In one embodiment, this invention provides for transmitting long-wavelength laser light (i.e., 10 $\mu$m. or more) for interacting the laser light with a relatively low-density plasma (i.e., $10^{19}$ particles/cm.$^3$ or less) over a short path length. More particularly in this regard 10.6 $\mu$m. laser light is interacted with plasma having a density below $10^{19}$ particles/cm.$^3$ for effectively heating plasmas to temperatures in the kev. range which are confined in a magnetic field. To this end, a $CO_2$ laser system is provided for heating a plasma confined in magnetic fields having strengths ranging from a few hundred kilogauss to a few megagauss. In another aspect, this invention provides a long-wavelength laser system for heating a toroidal plasma in successive stages. It is also advantageous to provide improved heating of plasmas by doping the same with high atomic number material, and/or by preheating the same to at least 100 ev. In still another aspect, this invention effectively heats linear or longitudinal extending plasmas. With the proper selection of means and their arrangement and use as described in more detail hereinafter, the desired long-wavelength laser heating of low-density plasmas to high temperatures is achieved.

BRIEF DESCRIPTION OF THE DRAWINGS

In the drawings, where like elements are referenced alike.

DETAILED DESCRIPTION OF THE PREFERRED EMBODIMENTS

This invention is useful in producing and heating relatively low-density plasmas to high temperatures of thermonuclear interest. As such, this invention is useful in the field of controled thermonuclear fusion. More particularly, this invention is useful in producing and heating plasmas having densities at or below $10^{19}$ particles/cm.$^3$. Thus, this invention is useful in heating magnetically confined plasmas to which the previously applied controlled thermonuclear research reactors have been applied. For example, this invention is useful in heating toroidal plasmas that are magnetically confined in stellarators and tokamaks. However, as will be understood in more detail hereinafter, this invention is useful in heating magnetically confined plasmas in any of the conventional reactors known heretofore, comprising the above-mentioned reactors and/or any of the other closed, open-ended or linear reactors which have heretofore been applied to controlled thermonuclear research.

In understanding this invention, a number of formulae are presented that are important for the production, heating, and confinement of plasmas. The transport formulae used are those obtained from arguments based on mean free paths and mean free time between collisions. Where they can be compared, they agree substantially with those of Spitzer, "The Physics of Fully Ionized Plasmas." Also presented are the results of calculations for the energies, densities, times, magnetic fields, etc., that are required for actual controlled thermonuclear research devices, and corresponding smaller experiments that give significant results in the field. These calculations also give some idea of what is required, what can be done, and the versatility of the laser method of this invention for producing plasmas.

Symbols:
- $T_e$ ------ Electron temperature in ev.
- $T_i$ ------ Ion temperature in ev.
- $n_e$ ------ Electron density.
- $n_i = n_e/Z$ - Ion density.
- $N_e$ ------ Total number of electrons.
- $N_i$ ------ Total number of ions.
- $Z$ ------ Ionic charge.
- $\epsilon_e$ ------ Average energy per electron in ev.
- $\epsilon_i$ ------ Average energy per ion in ev.
- $f, \omega, \lambda$ --- Laser frequency, radian frequency, and wavelength.
- $f_p, \omega_p, \lambda_p$ - Plasma frequency, radian frequency, and the wavelength of light at the plasma frequency.
- $B$ ------ Magnetic field in gauss.
- $\tau_{ei}$ ------ Electron-ion thermalization time.
- $J$ ------ Energy in joules.
- $v$ ------ Expansion velocity.
- $l_{ab}$ ------ Absorption length.
- $\beta$ ------ Ratio of plasma pressure to magnetic pressure, $8\pi P/B^2$.
- $A$ ------ Atomic number.

The absorption length, $l$, of laser light in a plasma:

$$l_{ab} = \frac{5 \times 10^{27} T_e^{3/2}}{n_e^2 \bar{Z} \lambda^2} \left(1 - \frac{\lambda^2}{\lambda_p^2}\right)^{1/2} \quad (1)$$

where $\lambda$ is the wavelength of the light, $\lambda_p$ is the wavelength of light at the critical frequency ($\lambda_p^2 = 10^{13}/n_e$), $T_e$ is the electron temperature in electron volts, $n_e$ is the electron density, and $\bar{Z}$ is the mean ionic charge, to be associated with bremsstrahlung by $$\bar{Z} = \Sigma n_i Z_i^2 / \Sigma n_i Z \quad (2)$$

For the light to penetrate the plasma, $\lambda$ must be shorter than $\lambda_p$, or $$n\lambda^2 < 10^{13} \quad (3)$$

If $\lambda$ is somewhat smaller than $\lambda_p$, the factor $[1-(\lambda^2/\lambda_p^2)]^{1/2}$ is near one and can be ignored.

The energy required is:

$$j = 1.6 \times 10^{-19} (\epsilon_e N_e + \epsilon_i N_i) \quad (4)$$

For thermal equilibrium, $$\epsilon = \tfrac{3}{2} T$$

and $$J = 2.4 \times 10^{-19} N_e T (1 + 1/Z) \quad (5)$$

From the above-mentioned formulae, it will be understood that the absorption length decreases as $n_e^{-2}$ and as $\lambda^{-2}$. Thus, to get absorption in the shortest possible distance $n$ and $\lambda$ are maximized consistent with other constraints that must be satisfied. If there is no constraint on the density other than the requirement that the light penetrate the plasma, then from Eqs. 1 and 3, and ignoring the factor $(1-\lambda^2/\lambda_p^2)^{1/2}$, the absorption length is given by $$l = 50 T_e^{3/2} \lambda^2 \quad (6)$$

For this optimum condition the absorption length goes as $\lambda^2$. Thus, at optimum density, short wavelengths are advantageous.

However, available lasers may limit the wavelength we can use and the density may be limited by the strength of magnetic fields available for confinement. The magnetic field required to confine the plasma (assuming that the magnetic pressure B equals the plasma pressure P, which is equivalent to the well-known expression $\beta = 1$)

$$n_e(1+1/Z)kT = B^2/8\pi \quad (7)$$

or $$B = 6.3 \times 10^{-6} \sqrt{n_e(1+1/Z)T} \quad (8)$$

The rate of energy loss is crucial to whether or not a self-sustaining reaction can be achieved. In this regard, the distance heat diffuses in a time $t$, either without a magnetic field or parallel thereto, is given by $$l^2 = \frac{4.5 \times 10^{19} T_e^{5/2} t}{(Z+1)(n_e + n_i)} \quad (9)$$

With regard to the energy loss by heat conduction across a magnetic field, the distance heat diffuses thereacross in time $t$ (taking into account only classical processes) is given by $$l^2 = \frac{Z 10^{-2} A^{3/2} n_e t}{B^2 \sqrt{T}} \quad (10)$$

With regard to the above-mentioned classical confinement time, the distance over which the plasma will diffuse in time $t$ is given by $$l^2 = \frac{2.5 \times 10^{-4} n_e \bar{Z} t}{B^2 \sqrt{T}} \quad (11)$$

As is well known, the Bohm confinement time is in contrast to the classical diffusion time. This Bohm time is an empirical relation that has often been found to agree with experimentally observed confinement times. According to the Bohm diffusion formula, the distance the plasma diffuses in a time $t$ is given by $$l^2 = \frac{2.5 \times 10^7 T_e t}{B} \quad (12)$$

Now the magnetic fields provided in stellerators, tokamaks, multipoles, and the various other well-known plasma research reactors, have provided actual confinement times many times as long as the Bohm time. As reported in the Congressional Hearings for the 91st Congress, before the subcommittee on appropriations in the U.S. Senate, p. 1654 of AEC and Public Work Appropriations, 1971 (H.R. 18127), part 3, vol. 2, which is also referred to hereinafter, for example, octupoles have provided confinement times up to 300 Bohm times, which approximates classical diffusion times.

Further formulae of interest are as follows:

The electron-ion thermalization time is:

$$\tau_{ei} = \frac{4.5 \times 10^7 T_e^{3/2} A}{Z^2 n_e} \quad (13)$$

The thermal velocity of the ions is:

$$v_i = 10^6 \sqrt{T_i} \quad (14)$$

The thermal velocity of the electrons is:

$$v_e = 4.5 \times 10^7 \sqrt{T_e} \quad (15)$$

The velocity of a free expansion is:

$$v = 10^6 \left(\frac{3}{A}(ZT_e + T_i)\right)^{1/2} \quad (16)$$

The conditions for obtaining a net energy gain from a thermonuclear reactor is the Lawson criteria. In this regard, to produce more energy than is required to heat a deuterium-tritium (DT) mixture to thermonuclear temperatures, i.e., 10 kev.

$$n\tau = 6.7 \times 10^{13} \quad (17)$$

where $\tau$ is the confinement time for the energy. If the efficiency of the heating ratio, i.e., the ratio of energy in the plasma to the total energy required by the laser, is $\epsilon_1$, then the condition is more severe and we require $$n\tau = \frac{6.7 \times 10^{13}}{\epsilon_1} \quad (18)$$

If only the fraction $\epsilon_2$ of the thermonuclear yield converts into useable energy for heating new material, then the condition to be satisfied is:

$$n\tau = \frac{6.7 \times 10^{13}}{\epsilon_1 \epsilon_2} \quad (19)$$

However, the last two conditions apply only to pulse-type operation. For steady-state or semisteady-state operation, the energy released in the reaction maintains the temperature and heats new fuel. Here the conditions are somewhat changed. For example, since only the $\alpha$-particle energy is available to heat the fuel directly, and this contains only 20% of reaction energy, the confinement time for energy must at least satisfy the condition $$n\tau = 3.4 \times 10^{14} \quad (20)$$

and the mean confinement time for a particle must at least satisfy this condition.

The reaction rate falls off very rapidly with temperature. At a temperature of 4 kev. the rate is down by a factor of 14. At this temperature the energy released in $\alpha$-particles can just maintain the temperature against radiative energy loss and this is the lowest temperature at which the reaction can be self-sustaining. At this temperature the particles must be confined for a time such that $n\tau$ is equal to $$n\tau = 4 \times 10^{14} \quad (21)$$

so that the reaction produces as much energy as was required to heat the plasma. However, with magnetic confinement it is possible to use more than twice as high a density at 4 kev., and therefore $\tau$ increases by only a factor of 3 over its value for 10 kev. Also, the energy confinement time may increase with lower temperature, as $T^{-5/2}$ for heat conduction loss parallel to a magnetic field, or as $T^{-1}$ if Bohm losses exist so that it can be advantageous to operate at a temperature somewhat lower than 10 kev.

Consider now a plasma produced by 1 $\mu$m. radiation from a neodymium glass laser. The optimum absorption length given by Eq. 1 above for a 10 kev. plasma with Z of 1, is 0.5 cm. This plasma would have a density of $10^{21}$ electrons/cm.$^3$, a pressure of 32 megabars, and would require a field of $30 \times 10^6$ gauss for its confinement. However, by confining this plasma in a magnetic field in a stellarator, tokamak, or other such device, the reactor need not be only 0.5 cm. long but can have dimensions in meters, whereby the densities can be below the mentioned optimum. For example, at a density of $10^{19}$ particles/cm.$^3$, the absorption length increases to 50 meters. Also, the pressure required is $3 \times 10^5$ atmospheres, and the field required is $3 \times 10^6$ gauss. In this regard, if now at the same time that the plasma density is $10^{19}$ particles/cm.$^3$ and the laser light wavelength is about 10 $\mu$m., then the absorption length is only 50 cm. Thus, as will be understood in more detail hereinafter, it is advantageous to employ a laser-light wavelength $\lambda$ of about 10 $\mu$m. or more.

In this regard, as will be understood from the above, laser wavelengths of longer than 10.6 $\mu$m. can be employed for heating a plasma. One example of one such longer wavelength is provided by a water-vapor laser, where the laser-light wavelength is >10.6 $\mu$m. Examples are water-vapor lasers and hydrogen cyanide lasers. Description of these can be found in "Closing the Far-Infrared Gap" by P. D. Coleman, Laser Focus, vol. 5, No. 17, 1969, and "Repetitive Q-Modulated HCN Gas Meser" by P.G. Frayne, J. Phys. B (Atom Molec. Phys.), ser. 2, vol. 2, 1969.

Now referring to the above-described long-wavelength laser of this invention which has a wavelength greater than 10 $\mu$m., it is known that $CO_2$ lasers for producing wavelengths of 10.6 $\mu$m. can produce a plasma from solid material. As described and shown in FIG. 2 of "Plasma Production and Heating by Laser Radiation" by F. P. Kupper, Rijnhuizen Report 68-44, February 1968, pulsed $CO_2$ lasers are currently available for this purpose. This invention utilizes a $CO_2$ laser like the one described in this above-mentioned Kupper publication. However, as will be understood by one skilled in the art, any of a wide variety of other long-wavelength pulsed lasers may be used in accordance with this invention. One such long-wavelength laser is described and shown in Final Report F920272-12 by Smith and Haught under Contract Nour 4696(00) with the Office of Naval Research. Another long-wavelength $CO_2$ laser, which operates continuously, is described in Abstract 23065 of vol. 23, No. 12. of Nuclear Science Abstracts. Thus, the long-wavelength laser of this invention is a pulsed or a continuously operating laser. Likewise a large variety of laser power outputs may be utilized in accordance with this invention.

In regard to the latter, commercially available laser power outputs can be increased by conventional auxiliary equipment and techniques well known in the art. For example, slow repetition rates and conventional switching may be used as described in the above-mentioned publication by Haught et al.; the reports by Haught et al. under U.S.A.E.C. contract AT(30–1)3578 with the United Aircraft Co., e.g. NYO 3578–1 through 3578–12, and copending applications Ser. No. 601,884, now Pat. 3,513,409 by Polk et al., entitled "Two Cell Dye Q-Spoiling of Laser," Ser. No. 536,898, filed Mar. 23, 1966, now Pat. 3,624,544, entitled "Self-Made Locking of Lasers Using Dyes," and Ser. No. 671,763, filed Sept. 27, 1967, now Pat. 3,521,069, entitled "Apparatus for Obtaining Narrow High Power Laser Pulse." $CO_2$ lasers developed at MIT under U.S.A.E.C. AT(30–1)3980 may also be employed with this invention.

In this regard, as described in report MIT 3980–45, multi-megawatt $CO_2$ laser pulses at high repetition rates are now available with components of high reliability and low cost. In this regard, while lasers are available that operate at or near atmospheric pressure, thereby reducing the need for high vacuum components, various high pressure lasers having various excitation schemes are available. For example, numerous simultaneous transverse electrical discharges distributed uniformly along a resonant cavity may be used. This method of excitation achieves population inversion rapidly and gain switching gives rise to giant-pulse operation automatically without the need for Q switching, while resistively loaded discharge electrodes in the laser cavity maintain fairly uniform distribution of the discharge along the cavity.

In the $CO_2$ laser described in the mentioned MIT publication and shown in FIG. V–4 thereof, the $CO_2$ laser has a series (17) of 1.1KΩ 0.5 w., carbon composition resistors spaced $\frac{3}{16}$" apart on plexiglass tubing, 2 in. OD x 34 in. long. The use of carbon or metal film resistors is avoided because they tend to explode when the discharge is initiated. The resistor leads act as cathodes. The anode is a polished brass rod, $\frac{3}{8}$ in. diameter. The gap between the anode and cathode is 1 in. The tubing is fitted with flat Brewster windows, and the optical cavity is formed by using a 5-M radius of maximum curvature reflector and a dielectric coated 10-M radius of curvature 65% reflectance output mirror. The mirror separation is 1.5 M. The laser peak power is about 1.1 MW. The laser repetition rate is 10 p.p.s. However, rates as high as 1000 p.p.s. have been reported by A. Beaulieu in "Atmospheric-Pressure $CO_2$ Laser" in Laser Focus, p. 14, February 1970. When the reflectivity of the mirror is lowered to 35%, the laser pulse is about 75 ns. wide.

It is also known that large variety of plasma material and constituent can be heated by lasers, as described in the above-mentioned publications. Also, the publications mentioned on p. 167 etc., of "Laser Applications in Plasma Physics (1962–1968)," IAEA, 1969, describe deuterium and tritium plasmas that can be produced and heated by lasers. Advantageously, this invention employs the above described $CO_2$ lasers for producing a deuterium-tritium plasma, but as will be understood in more detail hereinafter, this invention is not limited thereto.

It is also known that $CO_2$ lasers can heat solid materials to produce plasmas in conventional magnetic fields in a stellarator, as described in the above-mentioned abstract. As is well known, a stellarator has an evacuated container formed around an endless plasma equilibrium axis and conventional toroidal field for confining plasma in an endless column along the equilibrium axis in the container. One well known means for forming the toroidal field is provided by axial windings forming a solenoid around the outside of the evacuated container. In one embodiment, the invention described hereinafter utilizes a toroidal magnetic confining field of this type. Thus, as will be understood in more detail hereinafter, this invention utilizes a toroidal field such as described in the above-mentioned abstract. However, as will also be understood in more detail hereinafter, this invention is not limited to the toroidal field produced in the above-mentioned stellarator, but can be used with any of the conventional stellarators well known in the art for confining toroidal plasmas, such as the C stellarator and the tokamak at Princeton U., Princeton, N.J. The latter has actually been created from the C stellarator components as described in the hearings of the 91st Congress.

As will be understood from the above, $CO_2$ lasers can produce plasmas from high density materials, e.g., solids, and these plasmas can have temperatures up to several kev., but these plasmas are expensive or difficult to confine with existing magnetic fields. However, should enough passes of a $CO_2$ laser beam be provided in accordance with this invention, as described in more detail hereinafter, such heating can be obtained effectively at densities of $10^{19}$ particles/cm.$^3$ or less, and can be confined by existing toroidal magnetic fields. Moreover, in accordance with another aspect of this invention, plasma doping with high Z material (i.e., high atomic number—at least as high as He), the density can advantageously be reduced for CTR heating in conventional currently available toroidal magnetic fields in stellarators, tokamaks, etc. In this regard, pre-heating by conventional means, such as ion cyclotron resonance heating and/or pre-heating of the plasma to at least 100 ev., enhances the operation of the multiple pass, long-wavelength laser plasma heating system of this invention.

Figure 1A:
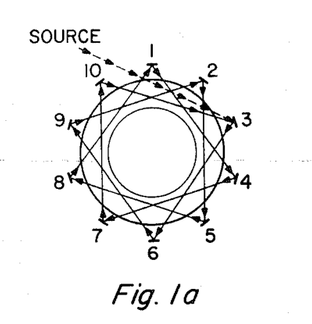
FIGS. 1a and 1b represent a partial top view of one embodiment for heating and confining a high-temperature toroidal plasma in accordance with this invention.
Figure 1B:
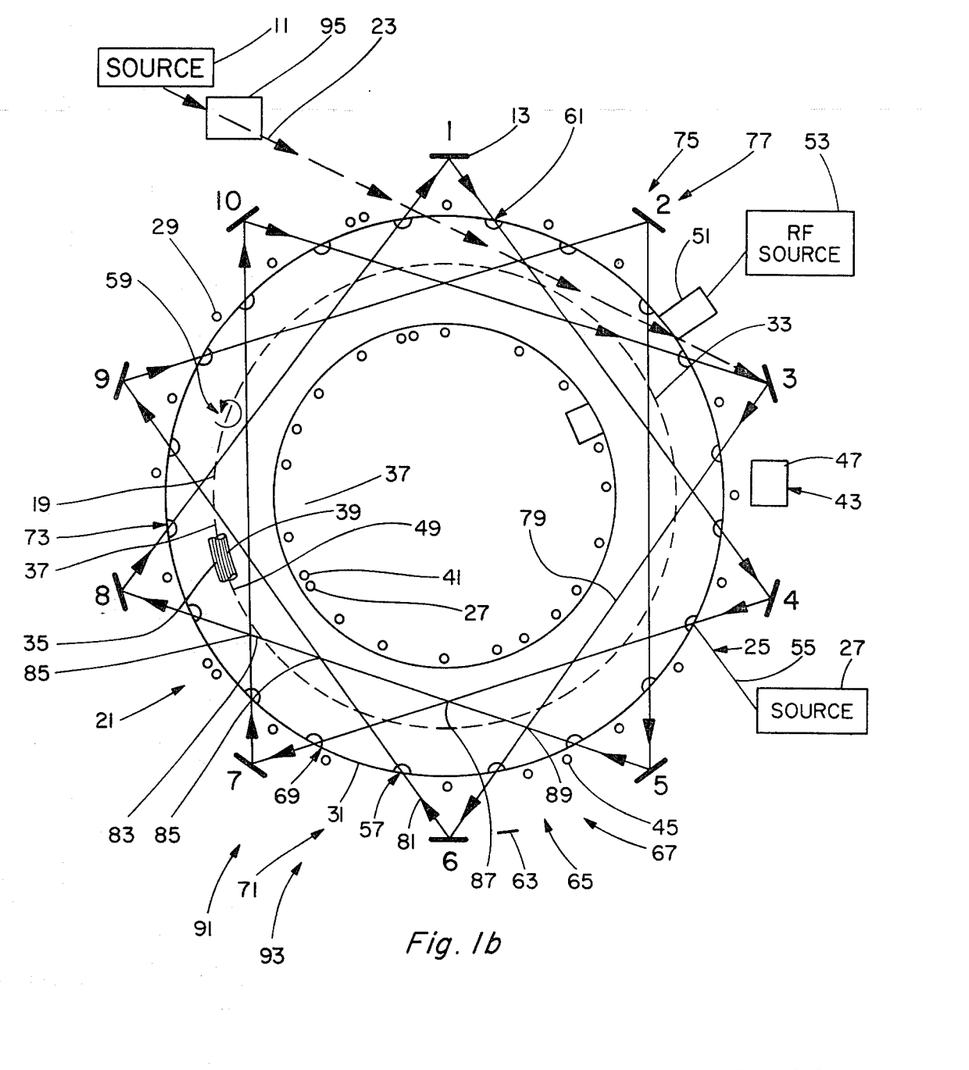

Referring now to FIG. 1a and FIG. 1b, in accordance with one embodiment of this invention, $CO_2$ laser 11 directs 10.6 μm. laser light against mirrors 13 for repeatedly passing the light through plasma 19 in successive stages in a reactor 21 having a magnetic field for confining the plasma in an evacuated container along an equilibrium axis. Thus, the plasma 19 can be heated to high temperatures at relatively low densities, and the plasma can be confined in practical or existing magnetic fields well known in the art. To this end, the reactor 21 may be any of the wide variety of well-known devices for magnetically confining a plasma along an equilibrium axis. For example, reactor 21 is advantageously a stellarator, comprising the model C stellarator that has been in actual use at Princeton University since about 1960. In this regard the actual parameters utilized in this embodiment are given in the conceptual design described in Princeton University Project Matterhorn Report PM–529 (NY07899) 1957. The design features of this stellarator are also described in U.S. Pats. 3,002,912; 3,012,955; 3,015,618; 3,016,341; and 3,278,384. However, as will be understood by one skilled in the art, this reactor 21 may be a stellarator that has been modified to form a tokamak, such as the tokamak at Princeton University.

In this regard, for ease of explanation examples of the typical parameters for reactor 21 in which the laser beam 23 from laser 11 is passed 2000 times through the plasma 19, are given in Table I as follows:

| | |
|---|---|
| Minor radius | $r = 10^2$ cm. |
| Major radius | $R = 10^3$ cm. |
| Plasma density | $n = 2 \times 10^{16}$. |
| Magnetic field | $B = 3 \times 10^5$ gauss (plasma $\beta = 0.1$). |
| Temperature | |
| Plasma energy | $T = 5 \times 10^3$ ev. |
| Required confinement time | $J = 1.6 \times 10^9$ joules. $3 \times 10^{-3}$ sec. = 2 Bohm times. |
| Number of passes required for absorption | 2000. |

In the operation of one example of the above-described embodiment of FIG. 1a, and FIG. 1b, where reactor 21 is an evacuated toroidal reactor, such as the model C stellarator at Princeton University, conventional means 25 are used to introduce plasma forming materials into the reactor 21. Advantageously, to this end DT gas is introduced into reactor 21 from source 27. However, any of a wide variety of other materials and methods may be used. For example, the gas may be doped with high atomic number elements such as argon, etc. Also, the plasma materials may be injected in the form of ionized material or pre-ionized molecules or particles. Also this reactor 21 has a conventional axial (solenoid-like) winding 29, one of which is shown for ease of explanation, arranged in the manner of a "solenoid" around the outside of vacuum container 31 along its entire endless axis 33 for producing in container 31 a toroidal magnetic field 35 having field lines 37 parallel to axis 33 and forming endless, cylindrical magnetic surfaces 39 that are concentric with axis 33. As well known in the art, this axial field produced by winding 29, advantageously, comprises periodically along axis 33, magnetic mirrors 41, which are described in detail in the above-mentioned stellarator patents. Means 43, such as helical windings 45 and/or ohmic heating means 47, provide with axial windings 29 rotational transform, shear and/or a pinch-like plasma current 49 for providing confinement times above the well-known Bohm confinement time. In this regard, ohmic heating means 47 and/or ion cyclotron resonance heating means 51, which are conventional, are energized with R.F. energy from a suitable source 53. As is well known, in ohmic heating, the plasma 19 acts as the secondary of a conventional transformer coil having a conventional iron core (not shown), thus to ionize a low pressure deuterium and/or tritium gas 55 at about 10.6 torr in container 31 to produce a plasma current 49 along axis 33 that pinches the plasma in a column 57 in a self-focusing poloidal field 59 produced by the plasma current. As described in the above-mentioned Lenard et al patent U.S. 3,278,384, the combination of the axial and helical conductors also provides a minimum average B plasma confining field along the reactor axis 33.

Advantageously, the container 31 has an inner copper liner 61, as is conventional with tokamaks such as the tokamak at Princeton University, and longitudinally extending conductors 63 along the outside of container 31 for centering the plasma column 57 along the endless plasma equilibrium axis 33 in the center of container 31. The current in these conductors 63 advantageously sequentially reverse in direction as one progresses in a cross-section around the circumference of container 31, and in this regard resembles the well-known Ioffe bars. These conductors 63 are well known in connection with the tokamak at Princeton U. and the stellarators there, which are described in the above-mentioned patents. The tokamak at Princeton University which is a modified C stellarator, as well as the T–3 tokamak are described in part 3, vol. 2, of the Senate Hearings before Com. on Approp., Public Works For Water, Pollution Control, Power Develop. and Atomic Eng., 2nd Session, HR18127.

Figure 3:
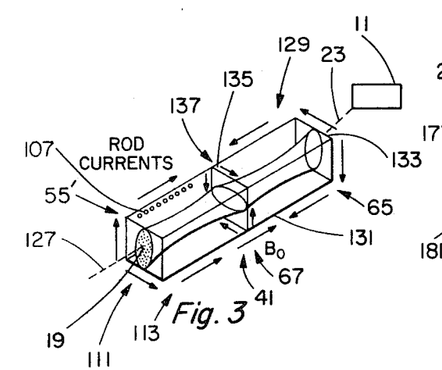
FIG. 3 is another embodiment of the apparatus of FIG. 2.

Conductors 63 may also be used that are rotated 90° in successive stages along the entire endless axis 33 to form periodic quadrupoles 67 (as also shown in FIG. 3). The above-mentioned periodic quadrupoles 67 produce minimum average B fields along the entire length of the endless axis 33 in toroidal reactor 21 and are arranged in stages 65 corresponding to the above-mentioned stages 65. Advantageously, these quadrupoles 67 are relatively rotated periodically 90° in each stage 65 for receiving and transporting the plasma particles in these successive stages 65 for alternately periodically focusing the plasma particles in successive horizontal and vertical planes. They also have the effect of providing periodic focii 69 between the successive stages 65. Advantageously, therefore the laser beam 23 intersects with the plasma 19 at these first focii 69, where the beam tends to have a small cross-sectional diameter and/or high density. However, the beam 23 is also interacted with the plasma midway between these first focii, i.e., inbetween the periodic quadrupoles 67 adjacent to the location 71, on axis 33 where the plasma tends to have an elliptical or relatively wide diameter. In this regard, the magnetic mirrors 41 are advantageously provided whose strength is greatest at locations 71.

Advantageously, container 31 has small porthole shaped windows 73 for receiving and transmitting the laser light beam 23 from and into the plasma 19 and from mirror 13 to mirror 13 in successive stages 75. To this end, the windows 73 comprise small transparent glass or sapphire windows having a diameter at least larger than the diameter of the laser beam 23. In this embodiment, the diameter of beam 23 is substantially less than the diameter of windows 73. Also, mirrors 13 advantageously efficiently reflect the laser light in each stage 75. To this end, the mirrors 13 are at least 99.98% reflecting. Advantageously, copper or gold mirrors 13 cooled to liquid nitrogen temperatures are used. This reduces the energy losses other than absorption in the plasma to about two parts in $10^4$ per pass of beam 23 through plasma 19. Also, mirrors 13 are arranged efficiently in each stage 75 to focus the laser light reflected therefrom into the plasma 19 at the center of the plasma column 57 along the endless equilibrium axis 33 thereof in container 31. Thus, for example, the mirrors 13 in each stage 75 provide conventional shapes for efficiently receiving and collecting the laser light after it passes through the plasma 19, whereby the mirrors 13 efficiently collect and focus the laser light back into the plasma 19 in each stage 75.

Advantageously, each pass of beam 23 through plasma 19 is roughly $2 \times 10^3$ cm. in length and the beam 23 makes about $5 \times 10^3$ passes through the plasma 19 for efficient absorption of the laser light energy from beams 23. Additionally, the mirrors 13 repeatedly receive and transmit the laser light beam 23 in successive stages 75 to form a laser light beam path 23 that repeatedly intersects in successive stages 75 and sequentially crosses, the endless equilibrium axis 33 of the magnetically confined toroidal plasma column 57 at an acute length angle 77. For example, this angle 77 is an acute angle of 45° or less than 45°. In the embodiment illustrated in FIG. 1, this angle is illustrated as being an acute angle of <45° which is formed by the intersection of the axis 79 of the laser light beam path 81 with the equilibrium axis 33 of plasma column 57. Also, the laser light beam path 81 forms the intersections 83 with itself on or adjacent to the equilibrium axis 33 between each successive mirror 13. Thus for example, beam 23 intersects with itself and with the plasma 19 from different directions at common points 85, 87, and 89 which lie between specific mirror locations 91 and 93 and like intersections are provided sequentially periodically between each of the other adjacent mirrors 13 as the laser-light beam path 81 progresses back and forth across equilibrium axis 33.

In still another example of the embodiment of FIG. 1a and FIG. 1b, the plasma 19 is doped to relax the parameters. In this regard, the absorption in plasma 19 of energy from multiple-pass laser-light beam 23 from laser 11 and mirrors 13, increase by doping the plasma 19 with high-Z material 55 having an atomic number higher than D or T. For example, with He and/or argon, etc., the absorption length for the 10.6 μm. laser light is $10^7$ cm., and each pass of the laser-light beam through the plasma is $2 \times 10^3$ cm. in length, and the light makes $5 \times 10^3$ passes through the plasma 19. To this end, this doping provides an increase of a factor up to five in the absorption coefficient which is acceptable since a pure DT plasma of 10 kev. is generating 50 times as much power as it is radiating, and one fifth of this energy (or ten times the radiated power) is deposited in the plasma 19 by the charged reaction products. Thus, in this embodiment, where an argon doped plasma density of $10^{16}$ to $10^{17}$ is provided, the laser absorption lengths by plasma 19 are $10^7$ to $10^5$ cm. At temperatures of 10 kev., the strength of the above-described magnetic fields in container 31 are $3 \times 10^5$ and $9 \times 10^5$ gauss respectively for the mentioned densities. For the latter embodiment, the laser light beam 23 makes 50 passes through plasma 19 by suitably arranging and adjusting mirrors 13.

In a still further example of the embodiment of FIG. 1, since the absorption length decreases as $\gamma^{-2}$, and the reflectivity of metal mirrors 13 improves as the laser wavelength increases, the laser wavelength for heating a plasma 19 having a density of $10^{16}$ particles/cm.$^3$, can be 300 μm, whereby the absorption length is as short as $10^4$ cm., which is equivalent to five passes through the above described lower density doped plasma 19. Even 30 μm. laser radiation reduces the number of passes of the laser light to 500 for this case. To this end, the above described water vapor or other long-wavelength laser system can be employed. Also, the 10.6 μm. $CO_2$ laser light from laser 11 can be efficiently down-shifted in frequency by a frequency shifter 95.

In another example of the embodiment of FIG. 1, a 5 kev. temperature plasma is confined at a density of $10^{19}$ particles/cm.$^3$ or less. In this regard, where the plasma density is limited by B (i.e., the ratio of plasma pressure to the plasma confining magnetic field pressure in reactor 21), the density confined goes like $T^{-1}$ and the absorption coefficient, which is proportional to $n^2 T^{-3/2}$, goes like $T^{-7/2}$. Because of this, in this example, the plasma 19 is at its ignition temperature of 5 kev. In this case, doping, which is described in more detail hereinafter, is not required, although it is optional. Also the above-mentioned 5 kev. plasma 19 of this example, gives an improvement factor of 11 in absorption over an undoped 10-kev. plasma 19.

In another example of the embodiment of FIG. 1, a 1-kev. plasma 19 is provided by the described or other conventional means in reactor 21. This increases the absorption coefficient by a factor of $3 \times 10^3$ over that for a 10 kev. plasma with the same toroidal magnetic field strength B, so that the required B is conventionally obtained. The parameters for this embodiment, comprise a plasma density in toroidal reactor 21 of $2.5 \times 10^{16}$ particles/cm.$^3$, a 10 cm. minor toroidal reactor radius, a 100 cm. major toroidal reactor radius; a toroidal magnetic field of 150 kg., $2.5 \times 10^6$ joules of laser energy from one or more lasers 11, between 100 and 1000 passes of the laser light beam through the plasma 19, and a Bohm confinement time of $6 \times 10^{-4}$ sec.

In another example of the embodiment of FIG. 1 the latter above-mentioned basic parameters are changed whereby laser 11 provides $10^4$ joules in $10^{-4}$ sec., and a 100 ev. plasma at a density of $2.5 \times 10^{16}$ in a 50 kg. toroidal magnetic field in a reactor 21 having a 30 cm. major reactor radius.

The described weak absorption coefficient system has the advantage that it allows a great deal of control in the heating of plasma 19. In this regard, the plasma 19 can be heated substantially uniformly or preferentially in certain predetermined regions by repeatedly passing the laser beam 23 through those regions, e.g., at intersection 83.

Also, at the above described lower temperatures existing on the way to achieving a $10^4$ ev. plasma 19, the absorption is efficient, so that the weak adsorption coefficient only decreases significantly in efficiency near the end of the heating period. In regard to the latter, however, thermonuclear burning provides a high overall efficiency for the described reactor 21.

Figure 2:
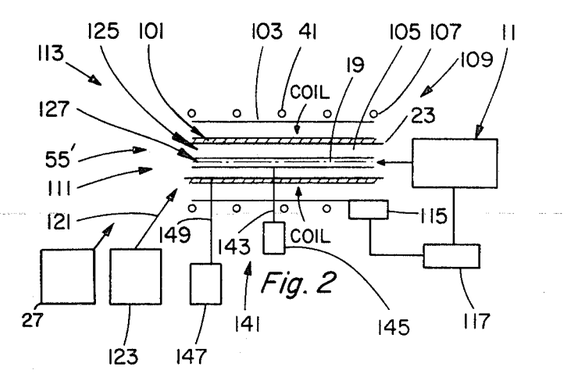
FIG. 2 is a partial cross-section of a linear plasma device for heating and confining a high-temperature plasma in accordance with this invention.

The above has described several examples of the apparatus and method of this invention for heating a toroidal plasma, but as will be understood by one skilled in the art, the long-wavelength system of this invention can also be used to heat linear plasmas to which the previously employed controlled, open-ended, thermonuclear, and/or linear, plasma research reactors have been applied. In this regard, it is known that long straight tubes 101 are available wherein a plasma 19 is confined away from the walls 103 of the tube 101 by a strong axial magnetic field 105, which is produced in tube 101 by an axial solenoid 107, as illustrated by the apparatus of FIG. 2. The apparatus of FIG. 2 of this application corresponds to the apparatus shown in FIG. 4 of my above-mentioned copending application.

It is well known that a plasma 19 in tube 101 tends to stream out the ends 109 of tube 101, whereby the plasma 19 is lost in a time of the order of $$\tau = \frac{L}{V_T} \approx 10^{-8} L \text{ sec.}$$

For example, consider a solenoid 107 of length L producing a magnetic field B. A plasma column 111 of radius r is to be created in the center of solenoid 107 in evacuated tube 101. The situation is quite similar to that produced in Θ pinches, such as described on p. 90 et seq. of "Project Sherwood—The U.S. Program in Controlled Fusion" by Amasa S. Bishop, Addison Wesley Publishing Company, 1958, except that the plasma 19 of this invention is produced by a long-wavelength laser 11 in accordance with this invention, such as the described $CO_2$ laser 11. Thus, the method and apparatus of this invention for creating the plasma 19 in tube 101 is independent of the method of creating the magnetic field B, and hence freedom is gained in accordance with this invention.

With a $\beta=1$ magnetically confined plasma 19, which has substantially been obtained in the heretofore known straight Θ pinch experiments, a magnetic field of $3 \times 10^5$ g. can be used. This is large, but well within the reach of pulsed-field technology although static fields B can also be employed. In this regard, normal resistance conductors and/or superconductors stabilized with normal resistance metals, such as copper, can be used, as is understood by one skilled in the art. The magnetic pressure B associated with this field of $3 \times 10^5$ g. is $4 \times 10^3$ atmospheres, which can confine a plasma of $n_e = 10^{17}$ $$n_e = 10^{17}$$
$$T = 10 \text{ kev.}$$

The absorption length for such DT plasma 19, as obtained from Ey. 1, is $l = 5 \times 10^5$ cm.

Accordingly, one example of the embodiment of FIG. 2, for a $\beta=1$ plasma 19, the following parameters are provided for a linear reactor 113 for providing a controlled thermonuclear fusion with the long-wavelength laser of this invention, such as the described $CO_2$ laser 11:

Magnetic field strength ________________ $3 \times 10^5$ gauss.
Plasma density ________________ $n = 10^{17}$ cm.³
Plasma temperature ________________ 10 kev.
Confinement time needed to give 10 times the energy required to heat the plasma ________________ $6 \times 10^{-3}$ sec.
Required length (no doping) ________________ $6 \times 10^5$ cm.
Absorption length (no doping) ________________ $5 \times 10^5$ cm.
Required energy (assumed plasma radius 1 cm.) ________________ $10^9$ joules.

If the efficiency of laser 11 is 30% ($\epsilon = 0.3$) and the efficiency of converting the thermonuclear output into electrical energy is 30% ($\epsilon_2 = 0.3$), then by Eq. 19, the $n\tau$ required, $6 \times 10^{14}$. The length of this device is longer than the stopping distance for the reaction products, and also times longer than the absorption length. However, it is advantageous to shorten this length $l$ and to shorten solenoid 107 and tube 101 as much as possible to minimize cost, energy requirements, and to provide a device which does not produce more energy than can be used.

In accordance with one example of this invention, the thermonuclear output can be used to reexcite the laser 11 to increase the overall efficiency of the reactor. To this end, the output energy of the reactor 113 is received by means 115 and transferred to power supply 117 for laser 11. In this regard, any suitable transducer may be used for means 115. For example, means 115 is advantageously a conventional power source that converts the output energy from the reactor 113 to electrical power. Advantageously, therefore, means 115 is a conventional Carnot cycle machine 115, but it may alternately be a direct converter 115, such as a thermoelectric, thermionic, or magnetohydrodynamic device. Also, for purposes of absorbing the laser radiation the length $l$ of the solenoid 107 and tube 101 can be shortened by about a factor of five by doping the plasma 19 with a high-Z atomic number dopant, such as argon or elements having an atomic number higher than He.

Moreover, in accordance with another aspect of this invention, the length of the above-described reactor 113 is reduced in the embodiment of FIG. 2 by axially confining the plasma 19 with the material of walls 103. To this end, it is necessary to protect the walls 103 from the hot plasma 19 by providing a layer 119 of cold, high pressure gas 121 that is injected from source 123 between the plasma 19 and walls 103 and forms a cold plasma blanket 125. This cold gas blanket is required to absorb the high heat flux transported to the ends. Also, the walls 103, comprise magnetically permeable material, such as stainless steel or other suitable well-known materials, to withstand the required pressure of 3000 atmospheres, and suitable feed materials for plasma 19 are fed from sources 123, which is like source 27, into tube 101 whereby the fusion reaction in plasma 19 sustains itself against losses by heat conduction to the opposite ends 109 of tube 101. The time for the plasma cooling by such heat conduction is given by:

$$\tau = \frac{(R+1)n_e L^2}{10^{20} T_e^{5/2}} \quad (22)$$

Provided the heat confinement satisfies Eq. 20 (see MATT 782), the reaction will maintain the temperature. Thus, for $l^2$ $$l^2 = \frac{1.5 \times 10^{34} T^{5/2}}{(R+1)n_e(n_e + n_i)} \quad (23)$$

or for $n_e$ equal to $10^{17}$, $T = 10^4$, and the effective Z equal to 5, $$l = 5 \times 10^4 \text{ cm.}$$

This length is about ⅕ of the distance required to stop the reaction products, which will deposit ⅖ of their energy in the plasma 19. Thus we must increase $l$ by a factor of $\sqrt{2}$ so as to reduce heat conduction by a factor of 2 while the fraction of the reaction energy that is deposited is increased.

For the description densities the reactor of FIG. 2 is advantageously operated on a pulsed basis so that the walls 103 can withstand the intense fluxes of neutrons and radiation. In this regard the "cold" plasma blanket 125 forms a soft X-ray shield for walls 103.

When the above-described example of the embodiment of FIG. 2 contains an undoped plasma 19 at near the ignition temperature of 4.2 kev. the heat conduction is favorable, the stopping of the reaction products is favorable, and the absorption of the radiation is favorable in a linear reactor 113 having a length $l = 1.4 \times 10^4$ cm. However, as the axial magnetic confining field B increases, the length of tube 101 correspondingly can be decreased, this length $l$ being proportional to $B^{-2}$. Thus, for a field of $5\times10^5$ g., $l$ is $5\times10^3$ cm. when $\beta=1$. To the degree that this $\beta$ is not achieved, it is compensated for by the appropriate length $l$.

In another example of the embodiment of FIG. 2, the plasma particle end losses out the ends 109 of a cylindrical tube 101 are reduced by periodically applying conventional magnetic mirrors 41 along the length of tube 101, such as are well known in the art. Typical magnetic mirrors 41 that can be used in accordance with the above-described example of this invention are described on p. 51 et seq. and p. 167 et seq. of "Project Sherwood—The U.S. Program in Controlled Fusion" by Amasa S. Bishop, Addison-Wesley Publishing Company, 1958. Also, p. 61 et seq. of "Controlled Thermonuclear Reactions," a well known 1960, D. Van Nostrand Co., New York, Glasstone et al. publication, describes conventional magnetic mirrors.

In the operation of one example of the embodiment of FIG. 2, the solenoid 107 produces a periodic variation in the axial magnetic field B along the axis 127 of solenoid 107 (the axis of tube 101 also being co-axial therewith to produce periodic magnetic mirrors 41 along the axis 127 in the same way that the above-mentioned magnetic mirrors 41 are produced along the above-described stellarator axis 33. As illustrated in FIGS. 3.4 and 3.5 of the above-mentioned Glasstone et al. publication, the particles in a conventional magnetic mirror tend to move from a region of lower magnetic field strength along axis 127 to a region of higher magnetic field strength along axis 127 so that the particles will be reflected back into the former region. Thus, the conventional magnetic mirror tends to act as a sort of potential well that inhibits the escape of many of the charged particles (and loss of energy) at the ends thereof. In accordance with this example of the embodiment of this invention, the mirrors 41 are spaced a mean free path apart whereby the particles perform a random walk from one mirror 41 to the next adjacent mirror 41 etc., whereby the loss of the plasma out the ends 109 of tube 101 is by diffusion. Stated another way, this configuration will be understood by one skilled in the art as providing a modulated magnetic field so that the plasma 19 is magnetically pumped by the magnetic mirrors 41 as it flows axially out of the device. This dissipates energy that comes from the flow of the plasma along the plasma equilibrium axis 127 and through the magnetic mirrors 41, whereby this flow is dissipative and the diffusion is natural.

With the mean free path of the particles in plasma 19 equal to the spacing between mirrors 41, the diffusion coefficient is $$D = lV_T/M^2 \quad (24)$$

where $l$ is the separation between the mirrors 41. $V_T$ is the ion thermal velocity, and M is the magnetic field modulation ($M=\Delta B/\bar{B}$).

In this example the axial field B equals 300 kg. and the mirror field equals 500 kg. whereby M equals 0.3. Also, the plasma is doped so that the effective Z equals 5, and the mean free path is 200 cm. for a plasma density of $10^{17}$ particles/cm.³. Thus, the diffusion coefficient is $2\times10^{11}$ and the length of tube 101 is $L=3.3\times10^4$ cm., which provides an $n\tau$ of $5\times10^{14}$. Advantageously, there are 180 magnetic mirrors 41 along the length L of the reactor 113. One might also operate at 5 kev. a plasma density of $2\times10^{17}$, with mirrors every 100 cm. Then for the same magnetic field the diffusion coefficient is $9\times10^{10}$ and for a L of $3.3\times10^4$ we have an $n\tau$ of $2\times10^{15}$.

In another embodiment of the apparatus of FIG. 2, periodic quadrupoles 67 provide plasma stability along the axis 127 of the reactor 113. Referring to FIG. 3, for example, these periodic quadrupoles 67 provide a minimum average B configuration without internal conductors, as is understood in the art, e.g., as described in U.S. Pat. 3,278,384 by Lenard et al. These periodic quadrupoles 67 provide a basic field $B_0$ that is imposed along axis 127 periodically sequentially for receiving and transporting the plasma particles in successive stages 65. To this end, a cage 129 of conductors 63 is advantageously formed by four equally-spaced, longitudinally extending conducting rods 131 along the outside of tube 101 and located in cross-section at the corner of a square 133 whose axis coincides with the axis 127 of tube 101. The current alternates in direction from rod 131 to adjacent rod 131 progressing around the perimeter of square 133. Moreover, in each stage 65 the rod currents are relatively symmetrically rotated 90° in cross-section from stage 65 to stage 65 to form periodic quadrupole stages 65 as those terms are used in the accelerator art, as described in U.S. Pat. 3,171,025 to Collins et al. To this end, and also to provide successive magnetic mirrors 41, rods 135 transverse to axis 127 are normal to the longitudinal rods 131, and are located at junctions 137 between the adjacent quadrupole stages 65 to form the mirrors 41. Otherwise, as will be understood by one skilled in the art, the embodiment of FIG. 3 has the same elements and parameters described above for the described examples of FIG. 2. In this regard, the tube 101, walls 103, solenoid 107, magnetic mirrors 41, and long-wavelength laser 11, are the same for the described examples of the embodiments of FIGS. 2 and 3.

Further in regard to the above-described example of the embodiments of FIGS. 1, 2, and 3, it is advantageous to provide feedback stabilization. To this end, in one example, means 141, such as a Langmuir probe 143, detects long-wavelength instability waves, phase shifter 145 shifts the phase of the detected wave 180° and amplifier 147 feeds into plasma 19 through means 149, such as a Langmuir probe, the amplified, phase-shifted wave from amplifier 147 corresponding to the wave detected by probe 143. The long-wavelength laser radiation which heats the plasma may also be used for feedback stabilization. Other suitable systems for feedback and dynamic stabilization of the plasma 19 of this invention, employ the same or other forms of electromagnetic radiation, as described in co-pending applications Ser. Nos. 12,309 and 13,310, filed Feb. 18, 1970 by Handel et al. These co-pending applications are assigned to the assignee of this application, and the feedback stabilization systems described and shown in the mentioned Hendel et al. application are incorporated by reference in this application.

For the laser 11 to produce the desired long thin column 111 of plasma 19 described in relation to the embodiment of FIGS. 2 and 3, the laser beam 23 must be focused into an equally thin beam 23 over the length $l$ of the plasma column 111. If the beam 23 is diffraction limited the required radius for beam 23 for a given length $l$ is approximately given by $$r \approx \frac{1}{2}(l\lambda)^{\frac{1}{2}} \quad (25)$$

For a system (reactor 113) $10^4$ cm. long, and a wavelength of $10^{-3}$ cm. this would give a radius of 1.5 cm.

For such a plasma, it is advantageous to consider the self-focusing and/or defocusing of the beam by the plasma. If the plasma is produced by firing the laser 11 into a cold gas 55', the laser 11 and plasma 10 will be self-focusing because the central region of the plasma column 111 will be most strongly heated and the heated plasma 19 will expand slightly against the magnetic field 105 there to reduce the plasma density and the phase velocity of the laser waves. Thus, the laser beam 23 will produce a kind of waveguide for itself. In the embodiments of FIGS. 2 and 3, the plasma 19 will thus have higher densities toward the outside of the plasma in tube 101 when formed from a cold gas 55', and likewise in such a case, the plasma 19 will have lower densities toward the inside of the tube 101, i.e., in heated column 111 toward axis 127 of tube 101.

The plasma radius required for these long straight plasmas 19 is determined by the requirement that the radial loss of the plasma 19 and energy must not exceed the axial loss, e.g., these are already chosen to be just tolerable. Accordingly, the following values for the radii are given for the above-described conditions:

$r = 0.3$ cm. for classical diffusion where there is no heat conduction loss perpendicular to B;
$r = 2$ cm. for heat loss by classical heat conduction perpendicular to the cold gas surrounding the plasma 19;
$r = 52$ cm. for Bohm diffusion.

The energies required to heat the plasma 19 are:

$1.1 \times 10^6$ joules for classical confinement;
$5 \times 10^7$ joules for classical heat conduction to the cold gas blanket;
$4 \times 10^{10}$ joules for plasma loss or heat loss given by the Bohm formula.

Where diffraction limits the size of the beam 23, then for 10 $\mu$m. radiation and a $10^5$ cm. length, the radius is 2.5 cm. by Eq. 23. However, the cold, dense plasma blanket provides the self-focusing described above and Bohm loss is not expected.

The following example of the parameters of these self-focusing plasmas taking into account the flow of these plasmas through the magnetic fields of the embodiments of FIGS. 2 and 3, and other properties of interest. These are examples of plasmas which are not at the thermonuclear conditions, but which would be useful for experiments and might be of value for industrial use where hot nonthermonuclear plasmas are useful.

No. 1:

$n_e = 10^{18}$
$T_e = 100$ ev.
$B > 9 \times 10^4$ g.
$L = 10$ cm.
$l_{absorption} = 10$ cm.
$r = 10^{-1}$ cm.
$J = 15$ joules
$\tau = 5 \times 10^{-7}$ sec., free streaming out of the ends
$\tau_{Bohm} = 4 \times 10^{-7}$ sec. (assuming $B = 100$ kg.)
$\tau_{classical} = 4 \times 10^{-6}$ sec. (assuming an effective Z of 1)
$\tau_{classical\ radical\ heat\ conduction} = 10^{-7}$
$\tau_{classical\ heat\ conduction\ parallel\ to\ B} = 6 \times 10^{-6}$ (assuming an effective $Z = 1$)

No. 2:

$n_e = 10^{18}$
$T_e = 10^3$
$B = > 3 \times 10^5$ g.
$L = 100$ cm.
$r = 10^{-1}$ cm.
$J = 1500$ joules
$\tau_{Bohm} = 1.2 \times 10^{-7}$ sec.
$\tau_{end\ loss} = 1.67 \times 10^{-6}$ sec.
$\tau_{classical} = 1.2 \times 10^{-4}$ sec. (assuming $B = 300$ kg.)
$\tau_{classical\ radial\ heat\ conduction} = 3 \times 10^{-6}$ (assuming $B = 300$ kg.)
$\tau_{classical\ heat\ conduction\ parallel\ to\ B} = 3 \times 10^{-6}$ sec.
Confinement time $\tau$ (using 500 kg. mirrors every centimeter along the length to limit the flow out of the ends) = $10^{-5}$ sec.

Another aspect of this invention which applies to the embodiment described in this application, is the enhanced non-linear absorption that occurs when the laser frequency is at or slightly above the frequency of longitudinal waves in the plasma 19. This enhanced absorption is due to the excitation of longitudinal plasma oscillations, and this can occur if $\omega_p < \omega \lesssim 1.4\omega_p$, thus the instability occurs for densities down to about one half the critical density. The critical power required in a plasma 19 at a temperature of 1 kev. and a density of $10^{19}$ to produce this effect with 10 $\mu$m. radiation is $10^{11}$ watts/cm.²

A second nonlinear absorption mechanism occurs through the excitation of two longitudinal plasma waves by the laser photons in beam 23 from laser 11. For this case the laser frequency lies in the range $$2\omega_p < \omega \lesssim 2.8\omega_p$$

or for densities as low as 0.13, the critical density.

The power required for exciting these instabilities in plasmas of densities $10^{18} \sim 10^{19}$ particles/cm.³ at a 1 kev. electron temperature is between $3 \times 10^{14}$ watts/cm.² and $3 \times 10^{12}$ watts/cm.². Moreover, the laser energy can be absorbed in a very short distance (as short as 10 wavelengths) and the plasma temperature can be pushed to high values.

Thus, it is seen how the intense long-wavelength transverse electromagnetic laser waves of this invention with frequencies approximately equal to the frequency of plasma 19 produce useful plasma instabilities involving both ion and electron density fluctuations. For convenience, the application of these fluctuations to the heating of the plasma 19 in the herein described embodiments and examples of this invention are referred to hereinafter as parametric instabilities that lead to enhanced heating of plasma 19. Theoretical discussion of these parametric instabilities is given in papers co-authored by the inventor of this application in Phys. Rev. Letters, 25, 430–433 (1970); 24, 987–998 (1970); and Phys. Fluids, 12, 2586–2591 (1969).

These effects take place when the plasma frequency is at or relatively close to the laser frequency, within a factor of 2 or 3 whereby this effect is operable only down to densities of $10^{18}$ particles/cm.³. It would be most desirable to achieve enhanced absorption at densities of $10^{16}$. This would be possible with 100$\mu$ radiation which might be produced by the aforementioned H$_2$O laser or by down shifting 10$\mu$ radiation. Then the long-wavelength system of this invention is effective for heating the plasma 19 at least down to a density of $10^{16}$ particles/cm.³.

In addition to the above, the laser system of this invention involves significant inverse synchrotron absorption at multiples of the cyclotron frequency. The absorption length for this process is given by:

$$l = \frac{7 \times 10^8 B}{n_e} \left(\frac{m_o c^2}{kT_e}\right)^{j-3/2} \frac{1}{j^{j-3}} \quad (26)$$

$$j^2 < \frac{m_o c^2}{kT} \rightarrow$$

where $j$ is a multiple of the cyclotron frequency ($\omega/\omega_{ce}$) and $n_e$ is the electron number density, and $T_e$ is the temperature in ev. At $kT \approx 10$ kev., $m_o c^2/kT \approx 50$, and this is a large distance for $j$'s greater than 5 or 6. For 10 $\mu$m. radiation, $\omega$ equals $\omega_{ce}$ for a field of $10^7$ gauss. On the other hand, 100 $\mu$m. radiation increases this absorption mechanism, and higher fields also increase this absorption mechanism.

Figure 4:
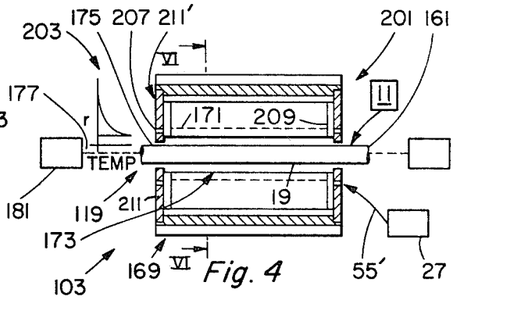
FIG. 4 is a partial cross-section of a device for confining a plasma in a $\theta$ field in accordance with this invention.
Figure 5:
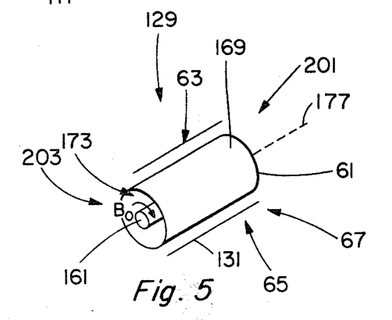
FIG. 5 is a partial three-dimensional view of the apparatus of FIG. 4 having structure from FIG. 3 added thereto.
Figure 6:
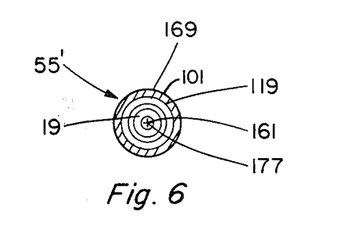
FIG. 6 is a partial cross-sectional view of the apparatus of FIG. 4 through IV—IV.

In another embodiment illustrated in FIGS. 4, 5, and 6 the plasma 19 has a central current carrying conductor 161 in addition to an annular, surrounding, cylindrical, metallic conducting wall 103. The wall 103 advantageously comprises normal resistance copper.

The central conductor 161 produces a magnetic field 171 in the $\theta$ direction, and is well known in the art, a plasma may be produced and confined between the central conductor 161 and the conducting wall 103. In accordance with this invention, a plasma 19 is produced in the annulus 173 by long-wavelength laser beam from laser 11 through a relatively low density DT gas 55' in this annulus 173.

While the $B_\theta$ field confines the plasma particles in the axial direction, such a field is well known to have flute instabilities, which tend to eject the plasma particles radially outward. In accordance with this invention, however, this flute instability is hydromagnetically stabilized by allowing the plasma to extend to the wall 103 so that the plasma pressure falls off radially outward and has a predetermined gradient described in more detail hereinafter.

In this regard in accordance with this invention the requirement for stability against fluting, which is also known as an interchange instability, is that $PV^\gamma$ must increase (or at least remain constant) with increasing radius $r$ from the outside 175 of the internal central conductor 161 in a direction away from the axis 177 of the conductor 161. Here V is the volume of the tubes of plasma containing equal magnetic flux, as that term is understood in the art, e.g., from the description in U.S. Pat. 3,278,384, $\gamma$ is the usual monatomic $\gamma$ for an adiabatic gas ($\gamma = C_p/C_v = 5/3$).

This above-described relation holds primarily for low $\beta$ plasmas. The requirement for stability is that $$Pr^{10/3} = \text{constant or increases with } r$$

With the density constant out to the wall 103, the temperature must satisfy the relation or $$Tr^{10/3} = \text{constant}$$

$$T = T_o \left(\frac{r_o}{r}\right)^{10/3}$$

at a $T_o$ in column 111 of 10 kev., and with a radius for the outer walls 103 10 times $r_o$, then the temperature of the plasma at the wall will be roughly 4.6 ev. While the described wall has the ability to withstand this latter temperature, this ability improves as the radius of this wall 103 increases, even slightly. Moreover, the temperature of the plasma 19 in tube 101, which is used for reactor 169, is made to fall off even more rapidly if the plasma density increases with $r$ and thus improves this capability of wall 103 even more. In this regard, the temperature of the plasma at wall 103 may be reduced to 1 ev.

This relatively thick layer 119 of relatively cool gas between the thermonuclear plasma 19 and the wall 103 offers a large measure of protection for the wall 103 from soft X-rays emitted by the plasma 19. This protection increases, moreover, as the plasma density in layer 119 increases near the walls 103, the mean free path of a 1 kev. photon through a hydrogen plasma at 1 ev. and a density of $10^{21}$ particles/cm.$^3$ being 0.5 cm. from Eq. 1.

A further advantage of the described embodiment of FIG. 4 results from the fact that the current-carrying central conductor 161 is under compression from the described magnetic field 171. Thus, large magnetic fields 171 can be provided with conventional equipment well known in the art. To avoid bulking instabilities in the central conductor 161, e.g., from kink plasma instabilities such as are well known in the art, suitable means 181 applies tension to central conductor 1611. For a thin central conductor 161 this tension which equals the magnetic pressure confining the plasma 19, is equivalent to a field of about $5 \times 10^5$ gauss. However, for finite radius central conductors 161, or for sufficiently short pulses, higher corresponding tensions and fields are provided. Thus, for fields of $10^6$ gauss, confinement of plasma densities of up to about $10^8$ particles/cm.$^3$ are contemplated by this embodiment of this invention at $10^4$ ev. where the absorption of the energy from the laser beam 23 by plasma 19 is efficient, and the absorption length, is $5 \times 10^3$ cm. under these conditions.

Examples of reactors 169 of the type described above, and illustrated in FIGS. 4, 5, and 6 have the following parameters:

| | |
|---|---|
| Central rod | 20 cm. |
| B field at rod surface | $5 \times 10^5$ gauss. |
| Central rod current | $5 \times 10^7$ amperes. |
| Current density in central rod | $4 \times 10^4$ amperes/cm.$^2$. |
| Inner radius of hot plasma | 25 cm. |
| Radius of outer wall | 250 cm. |
| Length | $10^3$ cm. |
| Plasma density | $3 \times 10^{17}$. |
| Plasma temperature | $5 \times 10^3$ at inner boundary. |
| Absorption length $1.8 \times 10^4$ cm. | 18 passes. |
| Energy required at start | $2 \times 10^9$ joules. |
| Time for heat loss by radial heat conduction (classical) | 0.02 sec. ($n\tau = 6 \times 10^{15}$). |
| Bohm time for the radial direction | $2 \times 10^{-3}$ sec. (if Bohm loss is outward); $8 \times 10^{-5}$ sec. (if loss is inward to the central conductor). |
| Classical time for diffusion to inner conductor | 1.4 sec. |
| Loss due to $\nabla B$ drift to the ends | $5 \times 10^{-3}$ sec. |
| Loss time of reaction products due to $\nabla B$ drift | $1.7 \times 10^{-5}$ sec. |
| Stopping time for reaction products | $4 \times 10^{-5}$ sec. |
| Lawson time for 5 kev. ($n = 3 \times 10^{17}$) | $1.4 \times 10^{-3}$ sec. |
| Length of time that the reaction must be kept going to produce as much energy as is contained in the magnetic field | $2.8 \times 10^{-3}$ sec. |

As with the other examples, a pilot experiment on such a device would be much smaller. The following is an example of what might be considered:

| | |
|---|---|
| Radius of central conductor | 2 cm. |
| Radius of outer wall | 21 cm. |
| Inner radius of plasma | 3 cm. |
| B field at the surface of the rod | $1.5 \times 10^5$ gauss. |
| Current in the central rod | $1.5 \times 10^6$ amperes. |
| Current density in central rod | $1.2 \times 10^5$ amperes/cm.$^2$. |
| Length | 100 cm. |
| Plasma temperature | 500 ev. at inner boundary; 1 ev. (about) at the outer wall. |
| Plasma density | $5 \times 10^{17}$ ($\beta = 0.3$ at inner boundary. |
| Absorption length | 170 cm. at inner boundary. |
| Energy required | $1.1 \times 10^5$ joules. |
| Time for heat loss by radial heat conduction | $10^{-4}$ sec. |
| Bohm time for radial direction | $10^{-4}$ sec. if such diffusion is outward; $10^{-5}$ sec. if such diffusion was to the inner conductor. |
| Classical diffusion time to the inner conductor | $4 \times 10^{-3}$ sec. |
| Axial loss due to $\nabla B$ drift | $3 \times 10^{-4}$ sec. |

Regarding the plasma confinement at the ends 201 and 203 of reactor 169, grad B drifts that produce charge separation are shorted out. To this end, in one example, pressure confinement at the ends 201 and 203 is provided by cold neutral gas 55' that is introduced into the annulus 173 of reactor 169 through holes 207 in end plates 209 and 211 from gas source 27, which is advantageously a DT source. In the region 211' where the gas 55' mixes with the plasma 19, currents are carried across the magnetic field 171 to the end plates 209 and 211.

Figure 7:
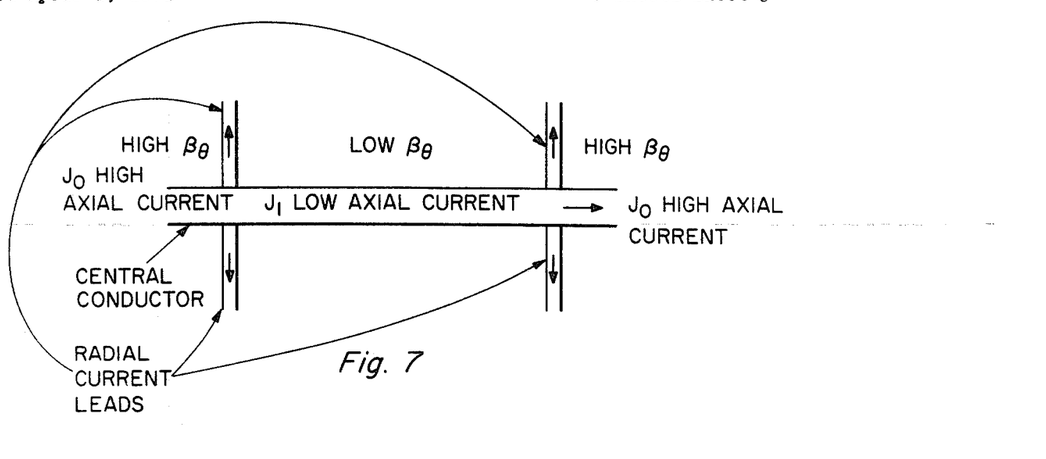
FIG. 7 is a partial cross-section of means for withdrawing current from the central conductor of the apparatus of FIG. 6.
Figure 8:
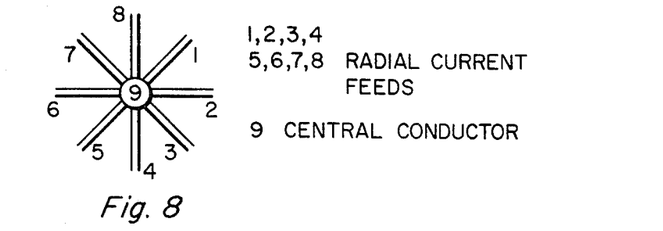
FIG. 8 is a partial end view of means for feeding current into the central conductor of the apparatus of FIG. 7.
Figure 9:
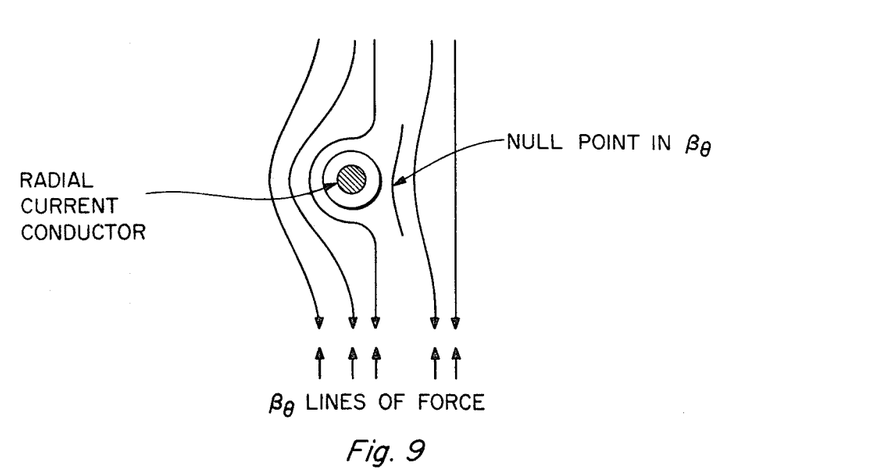
FIG. 9 is a partial schematic view of the lines of force in the vicinity of the radial current leads of FIG. 8.

In another example, current is withdrawn and fed into the central rod at points A and B, FIGS. 7 and 8, which are a short distance $\delta l$ from the ends. Since the axial current in the end sections is higher than in the center section B is higher in these regions. Thus, a minimum B is formed in the axial direction which prevents the axial loss of plasma. The magnetic field in the vicinity of the radial current leads is similar to a multipole field, FIG. 9, with the current wires being shielded from the plasma by the magnetic field which surrounds them. A null point in $B_\theta$ exists near each of the radial current fields for each value of $r$. The locus of these points form a line leading out of the machine along which plasma can be lost. Since this loss will be independent of the overall length of the device a critical length will exist for which the reactions can sustain the plasma against this loss.

While the above has described several specific embodiments and examples of existing and novel toroidal and linear plasmas and reactors, it will be understood by one skilled in the art that the various reactor systems described can be used alone and in combination with each other and the long-wavelength laser heating system of this invention. Thus, the described magnetic mirror and multipole configurations can be employed with any of the described toroidal or linear embodiments. Likewise, the described parametric instability heating can be employed with any of the described embodiments. Also, the described uniform or graduated temperature and density profiles can be used in any of the described embodiments alone or in combination with any of the other described magnetic confining, feedback stabilization, and/or dynamic stabilization systems and/or auxiliary heating and/or doping systems described above.

This invention has the advantages of providing a long-wavelength laser system for heating a relatively low density plasma to high temperatures. As such, this invention has the advantage of heating the magnetically confined plasmas to which the existing controlled thermonuclear reactors have been applied. For example, in one embodiment, this invention has the advantage of heating magnetically confined toroidal plasmas, such as are found in stellarators, tokamaks, spherators, etc., by repeatedly passing the long-wavelength laser light of this invention through the plasma in successive stages. Likewise, this invention also employs long-wavelength laser light to heat plasmas found in magnetic mirrors, and multipoles, both toroidal and linear. In this regard also, this invention has the advantage of heating a large variety of existing linear plasmas, as well as novel plasma provided by this invention in novel reactors.

What is claimed is:

1. In a controlled thermonuclear reactor, comprising a linear container means, and means for magnetically confining a plasma in a column in said container means so that said plasma flows axially out at least one end of said container means along an equilibrium axis in said container means, the improvement, comprising:
   (a) means for filling said container means with a gas in a column having a diameter and length in said container means for effecting the absorption of laser light therein in accordance with the density of said gas in said column;
   (b) means providing laser light having a wavelength of at least 10.6 micrometers along said equilibrium axis for heating said gas to form a plasma therefrom for effecting the magnetic confinement of the same along said equilibrium axis in said column; and
   (c) means for magnetically confining said plasma in said column that forms a theta pinch along said equilibrium axis and has periodic magnetic mirrors around said plasma along said equilibrium axis to inhibit the axial flow of said plasma along said equilibrium axis; said periodic magnetic mirrors being placed one mean free path apart so that they are spaced between 100 and 200 cm. apart along an equilibrium axis extending a distance for absorbing said laser light in said plasma along said equilibrium axis.

2. The invention of claim 1 in which said magnetic mirrors for magnetically confining said plasma are produced by a periodic quadrupole field means around said heated plasma along said equilibrium axis to provide stability.

References Cited
UNITED STATES PATENTS

| | | | |
|---|---|---|---|
| 3,278,384 | 10/1966 | Lenard et al. | 126—3 |
| 3,489,645 | 1/1970 | Darber et al. | 126—1 |
| 3,652,393 | 3/1972 | Kaiser et al. | 126—3 |

OTHER REFERENCES

Science, vol. 167, Feb. 20, 1970, pp. 1112, 1113.

REUBEN EPSTEIN, Primary Examiner

U.S. Cl. X.R.

176—3